(12) United States Patent
Seader

(10) Patent No.: US 9,622,547 B2
(45) Date of Patent: Apr. 18, 2017

(54) SYSTEMS AND METHODS FOR HOLDING FLAT STRAPS

(71) Applicant: Nite Ize, Inc., Boulder, CO (US)

(72) Inventor: Rex Seader, Superior, CO (US)

(73) Assignee: Nite Ize, Inc., Boulder, CO (US)

( * ) Notice: Subject to any disclaimer, the term of this patent is extended or adjusted under 35 U.S.C. 154(b) by 204 days.

(21) Appl. No.: 13/789,328

(22) Filed: Mar. 7, 2013

(65) Prior Publication Data

US 2014/0026373 A1   Jan. 30, 2014

Related U.S. Application Data

(60) Provisional application No. 61/634,848, filed on Mar. 7, 2012.

(51) Int. Cl.
*A44B 11/12* (2006.01)
*B60P 7/08* (2006.01)

(52) U.S. Cl.
CPC ............ *A44B 11/12* (2013.01); *B60P 7/0823* (2013.01); *Y10T 24/4077* (2015.01)

(58) Field of Classification Search
CPC ..... B60C 27/06; A44B 11/18; Y10T 24/4077; Y10T 24/4016; Y10T 24/4012; Y10T 24/4736; Y10T 24/4745
USPC .................................................. 24/193, 170
See application file for complete search history.

(56) References Cited

U.S. PATENT DOCUMENTS

| 3,440 A | 2/1844 | Hatch |
|---|---|---|
| 48,610 A | 7/1865 | White |
| 52,154 A | 1/1866 | Frye |
| 64,693 A | 5/1867 | Ogier |
| 163,195 A | 5/1875 | Hester |
| 223,556 A | 1/1880 | Thayer |
| 292,934 A | 2/1884 | Menzel |
| 342,110 A | 5/1886 | Kjellstrom |
| 350,226 A | 10/1886 | Youmans |
| 379,078 A | 3/1888 | Parker |
| 416,985 A | 12/1889 | Beattie |
| 906,391 A | 12/1908 | Dickson et al. |

(Continued)

FOREIGN PATENT DOCUMENTS

| CN | 1444885 A | 10/2003 |
|---|---|---|
| DE | 3043432 A1 | 6/1982 |

(Continued)

OTHER PUBLICATIONS

International Search Report in co-pending PCT Application No. PCT/US13/29687 dated May 14, 2013, 3 pages.

(Continued)

*Primary Examiner* — Robert J Sandy
*Assistant Examiner* — Rowland Do
(74) *Attorney, Agent, or Firm* — Haynes and Boone, LLP

(57) ABSTRACT

A flat strap holding apparatus includes a body and a rotating hub that rotates in an interior of the body. A gripping surface of the rotating hub is proximate to a gripping area in the interior of the body. The rotating hub is configured to rotate towards and away from the gripping area. The body has an attachment area, the attachment area having a plurality of apertures and a plurality of bars. The attachment area is located on a first side of the body and the rotating hub, and the interior is located on a second side of the body.

8 Claims, 21 Drawing Sheets

(56) References Cited

U.S. PATENT DOCUMENTS

| | | |
|---|---|---|
| 913,469 A | 2/1909 | Cleaveland |
| 950,434 A | 2/1910 | Carlson |
| 1,257,028 A | 2/1918 | Ryther |
| 2,622,293 A | 12/1952 | Wermlinger |
| 2,653,365 A | 9/1953 | Elsner |
| D188,897 S | 9/1960 | Prete |
| 2,998,626 A * | 9/1961 | Prete, Jr. .................. 24/170 |
| 3,091,830 A | 6/1963 | Harley |
| 3,134,153 A | 5/1964 | Harley |
| 3,253,309 A | 5/1966 | Baresch |
| 3,413,691 A | 12/1968 | Elsner |
| 3,678,542 A | 7/1972 | Prete, Jr. |
| 3,686,715 A | 8/1972 | Brodnicki |
| 3,872,550 A | 3/1975 | Yang |
| 4,097,023 A | 6/1978 | Muller |
| 4,125,115 A | 11/1978 | Mayo et al. |
| 4,130,949 A | 12/1978 | Seidel |
| 4,136,422 A | 1/1979 | Ivanov et al. |
| 4,398,680 A | 8/1983 | Ogawa et al. |
| D274,861 S | 7/1984 | Lindblad |
| 4,464,811 A | 8/1984 | Holmes |
| D283,369 S | 4/1986 | Martin |
| 4,717,088 A | 1/1988 | Fohl |
| 4,727,628 A | 3/1988 | Rudholm |
| 4,823,443 A | 4/1989 | Waters |
| 4,843,688 A | 7/1989 | Ikeda |
| D303,232 S | 9/1989 | Lortz et al. |
| 5,172,455 A | 12/1992 | Johnson et al. |
| 5,291,638 A | 3/1994 | Huang |
| 5,356,412 A | 10/1994 | Golds et al. |
| 5,423,644 A | 6/1995 | First, Sr. |
| D362,415 S | 9/1995 | Takimoto |
| D377,155 S | 1/1997 | Takimoto |
| 5,673,936 A | 10/1997 | Mondel |
| 5,809,620 A | 9/1998 | Crowley et al. |
| 5,904,198 A | 5/1999 | Huang |
| 5,920,963 A | 7/1999 | Chou |
| 6,081,973 A | 7/2000 | Liu |
| 6,148,485 A | 11/2000 | Wu |
| 6,543,096 B2 | 4/2003 | Settelmayer et al. |
| 6,735,826 B2 | 5/2004 | Uehara et al. |
| 6,868,587 B2 | 3/2005 | Rard |
| 6,877,189 B2 | 4/2005 | Simonson et al. |
| 7,334,301 B2 * | 2/2008 | Huang ................. 24/170 |
| D670,154 S * | 11/2012 | Kelleghan .............. D8/356 |
| 8,327,507 B2 * | 12/2012 | Eisinger ................ 24/170 |
| 2001/0054219 A1 | 12/2001 | Settelmayer et al. |
| 2003/0172499 A1 * | 9/2003 | Uehara et al. ............ 24/170 |
| 2008/0277914 A1 * | 11/2008 | Carine et al. ............ 280/801.1 |
| 2009/0100645 A1 * | 4/2009 | Weng ................. 24/170 |
| 2011/0138588 A1 * | 6/2011 | Shiue ................. 24/628 |

FOREIGN PATENT DOCUMENTS

| | | |
|---|---|---|
| DE | 29701473 U1 | 3/1997 |
| FR | 2378469 A1 | 8/1978 |
| FR | 2484216 A1 | 12/1981 |

OTHER PUBLICATIONS

Chinese Search Report in corresponding Chinese Patent Application No. 201380023793.2 dated Apr. 20, 2016 (2 pages).

* cited by examiner

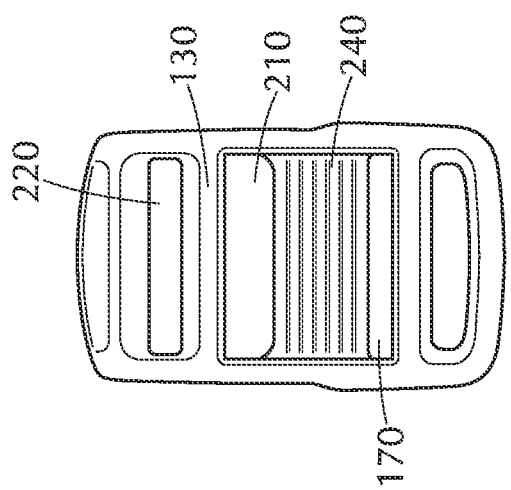
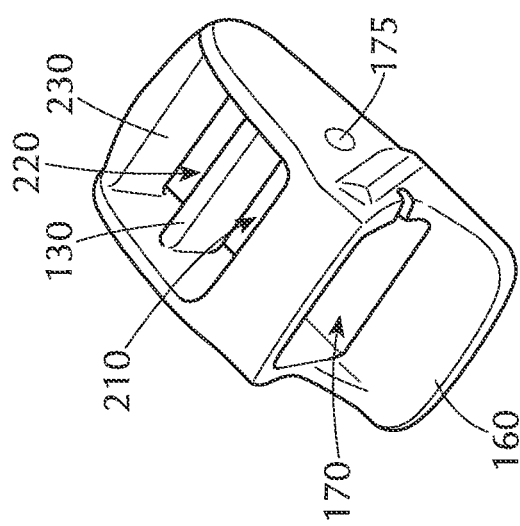

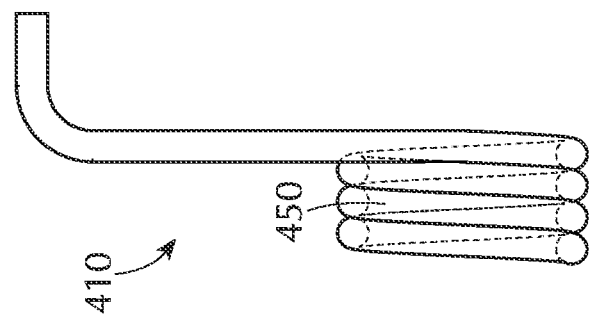
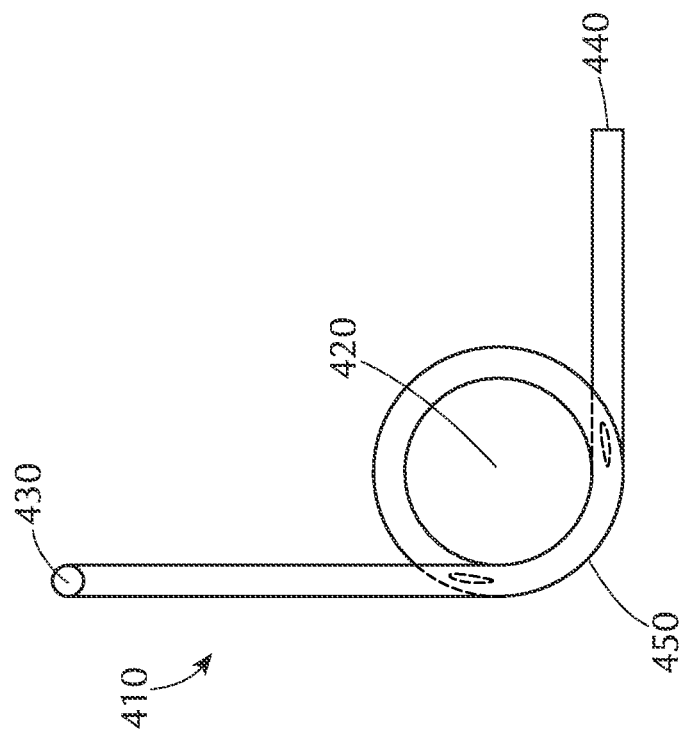

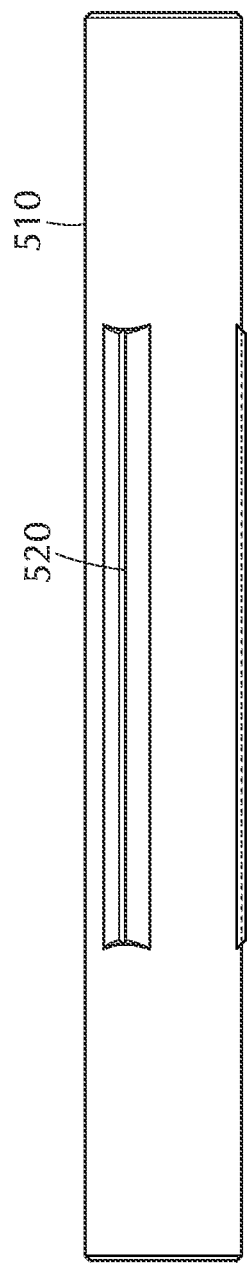
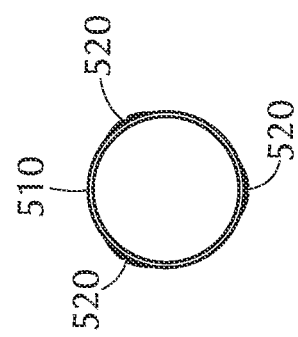

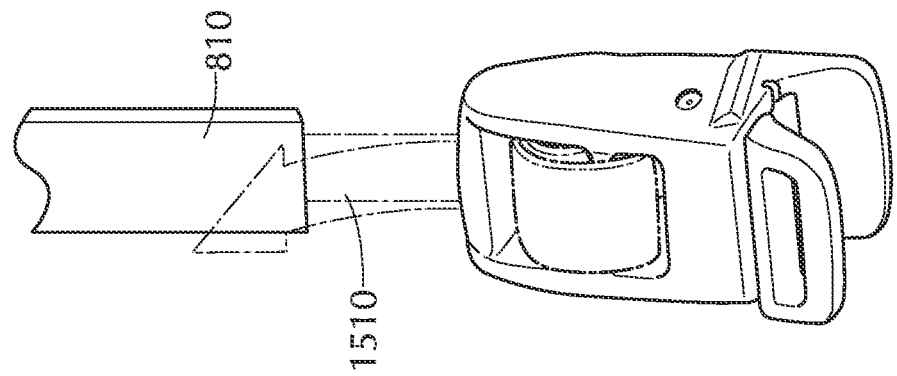
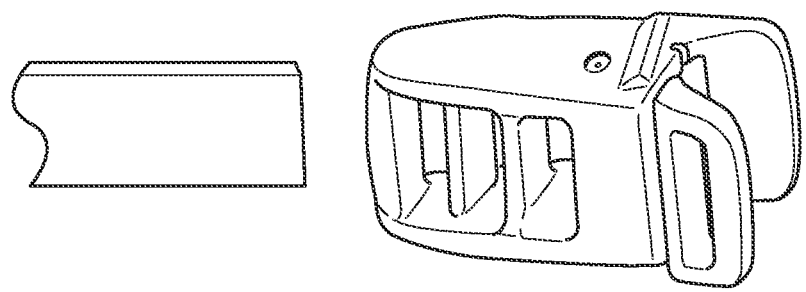
FIG. 15

SYSTEMS AND METHODS FOR HOLDING FLAT STRAPS

CROSS-REFERENCE TO RELATED APPLICATIONS

This application claims the benefit of U.S. Provisional Application No. 61/634,848 filed Mar. 7, 2012, which is hereby incorporated by reference to the same extent as though fully contained herein.

BACKGROUND

Flat straps are used for many applications that typically require one or both ends of the flat strap to be secured in some manner. Tying knots in flat straps are particularly troublesome because they can be incredibly difficult to untie once tension has been applied to the knot. Often the remedy is to cut the knot from the flat strap. Given that the flat strap typically is much wider than it is thick, attempting to use flat straps in a manner similar to ropes can be impractical. Flat straps are very flexible, resistant to stretch, typically stronger than rope and, compared to rope, usually much friendlier in how they interact with objects bound by them.

In most applications that utilize flat straps to secure or bind objects, the incorporation of an ancillary device to manage the tightening and/or binding of the flat strap is required. Most devices designed for flat straps take advantage of the greater strength of flat straps and, therefore, provide means to increase the binding tension applied to the load beyond what one could manually achieve. Also, these devices attempt to provide repeatability and convenience in terms of set-up and use. Two particular types of devices are most prevalent. They are commonly known as ratchet devices and cam-lock devices.

Ratchet devices find use in high load applications where supporting or inducing a large amount of tension in the flat strap is required—usually far above what a normal person would be capable of generating. To achieve this level of tension, some form of mechanical advantage or amplification of force is required. Ratchet devices do this by utilizing a lever implemented in a manner where the flat strap is 'levered' into the device and wound around a drum. To prevent the device from losing the induced tension in the flat strap, a ratchet scheme is used. Small increments of rotation of the tensioning lever are preserved by a directional locking scheme or ratchet action. Typically, several components are required in the construction of a ratchet device—toothed ratchet plates, springs, lockout and release brackets, a center drum, a lever/handle, etc. The primary advantage of a ratchet device is the high level of tension that can be generated in the flat strap. However, ratchets often are complicated devices both in terms of construction and in their use. They are limited in the amount of flat strap they can accommodate on the drum, frequently requiring repeated resets of the device or a significant amount of pre-tensioning or manual cinching of the load prior to use. Also, it is not uncommon for the flat strap to misalign or foul as it is drawn into the device, which can easily render the device unusable.

Cam-lock devices are used in lower load applications and in applications where ease of use, cost, and simplicity are important. A cam-lock device typically is comprised of a small frame or chassis, a locking mechanism commonly incorporating a torsion spring, and a shaft or swage pin to attach the locking component and spring to the chassis. Integrated into the chassis is some kind of static drum or wrap bar over which the flat strap is drawn into the device.

Similar to ratchet devices, cam-lock devices are directional. Cam-lock devices allow the flat strap to be drawn into and through the device but prevent the flat strap from reversing back out of the device. The 'cam' designation typically comes from the manner in which the component(s) are used in preventing reversal of the flat strap. As more tension is applied to the flat strap, there is a stronger impulse for the strap to be drawn back through the device.

To accommodate the increase in tension, the cam force or locking action must increase proportionally. The particular shape of the cam or locking component(s) are such that, as tension in the flat strap increases, the cam is drawn tighter to the wrap bar, or the gap through which the flat strap is held in place is made smaller. Additionally, the release of the locked 'cam' usually requires only overcoming forces normal (perpendicular) to the tension in the flat strap rather than overcoming the tension in the flat strap directly. Quite common in the design of a cam-lock device is the use of a torsion spring to press the locking component into the flat strap. The locking component usually incorporates some form of teeth, points, or grip geometries to help initiate and sustain the 'cam-action' as the flat strap attempts to back out of the device. The torsion spring does not contribute to the locking force of the device per se; rather, it helps to insure that the locking component initiates engagement of the flat strap.

The primary advantage of a cam-lock device is ease of use. The user presses on one end of the locking component (usually configured as a lever to generate mechanical advantage) to lift the grip portion of the component away from the drum or wrap bar and feed the flat strap into the device. Once the flat strap is fed into the device, the spring loaded lever is released, allowing it to press against the flat strap. To tighten or secure the flat strap, the user simply draws the strap through the device. To release the device, the user presses the lever, lifting it away from the flat strap.

There are several limitations or disadvantages in using cam-lock devices. At high loads, releasing the locking device can result in a violent movement of the strap/device. Most users familiar with cam-lock devices have learned to be quite attentive when they release the device.

Often the limitations of a particular cam-lock device stem from how the device is implemented. It is not uncommon for manufacturers to route the flat strap through a sharp transition (around an edge of the device) before routing the flat strap through the locking portion of the device. Doing this severely weakens the flat strap and is a key limiter in the load which the device can be rated to support—and usually is significantly lower than the rated capacity of the flat strap. This is particularly common in inexpensive devices that utilize metal stampings for the device chassis.

Another common limitation is that the locking action often is confined to a small area of the flat strap. This is required in order to generate enough locking force to thoroughly engage the cam action to prevent the flat strap from slipping through the device, or it is the result of a design that has no capability to distribute the locking action in any other way. For example, a 'single-line' contact formed between two cylinders (the wrap bar portion of the chassis and the locking lever) is the most prevalent design reason for the limitation. The down side to this, besides the flat strap slipping, is similar to the issue described above—the highly localized stress applied to the flat strap can severely limit the load bearing capacity of the flat strap.

Another malady of cam-lock devices concerns the flat strap itself. Usually, no provisions are made to address how the flat strap exits the device—leaving the locking component (release lever) and/or the flat strap exposed and vulnerable to damage or inadvertent release. The remedy to this leaves the user to tie the free end of the flat strap around the device or to tie the free end around the flat strap under load—arguably defeating the purpose of using a cam-lock device in the first place.

Also, while providing some leverage in assisting the tensioning of the flat strap, cam-lock devices typically are limited to a maximum 2-to-1 mechanical advantage—that being the result of drawing the flat strap around the fixed drum or primary wrap bar.

Obviously, both types of flat strap devices, the ratchet and the cam-lock, have found wide use in the world. However, people often have to make compromises in the use of either device.

SUMMARY

This application relates to devices used with flat straps (webbing) and more specifically devices used to secure flat straps or to secure objects using flat straps.

The device described herein alleviates many of the concerns and issues with both the ratchet and cam-lock devices and provides in a single device the higher mechanical advantage similar to that afforded by ratchet devices combined with the simplicity and ease of use of a cam-lock device. Additionally, the device does not suffer the limitations of most cam-locks devices. Highly localized stresses in the flat strap are avoided, allowing utilization of a higher percentage of the rated load capacity of the flat strap. Also, provisions are incorporated into the device that limit the potential for inadvertent release of the device while simultaneously providing a clean and elegant way to dress the flat strap upon exiting the device.

Most cam-lock devices are permanently attached to a flat strap, typically by sewing one end of the flat strap to the cam-lock device. The free end of the flat strap then is configured around the objects to be secured and fed back into the device. An embodiment of the device described herein utilizes the same technique. Another embodiment provides the means to position and releasably secure the device anywhere along the length of a flat strap. This provides the means to convert any free end of a flat strap, whether already part of a bound configuration or not, into a 'device-available' flat strap; or the device could simply be configured with a flat strap that is not permanently attached to the device.

In one embodiment, a system for holding flat straps includes a device body, the device body having an attachment area for attaching a strap, and a cam area for adjustably attaching a strap. The system further includes a hub oriented in the cam area such that the hub may rotate to capture the strap between the hub and the device body. Optionally, the strap is attached to the attachment area by sewing the strap to itself and passing it around a bar of the device body. In one configuration, the attachment area includes a plurality of bars and apertures, the plurality of bars oriented parallel to each other, such that the strap may be wrapped around them to hold the strap. In one alternative, a pin holds the hub in the device body. In another alternative, the hub includes a gripping surface and the body includes a gripping portion. Optionally, the cam area is a cavity in the device body where the hub is positioned to rotate, having an arm with a gripping surface that extends from the arm that is nearly tangential to the hub, and the gripping surface of the hub having a plurality of raised protrusions which extend substantially perpendicularly from the arm of the hub toward the gripping portion on the underside of the body. In another alternative, the arm of the hub extends radially away from a rotation point of the hub, the gripping surface positioned such that it opposes the gripping portion of the body such that the hub may rotate around the rotation point and during rotation moves closer and farther away from the gripping area, depending on the direction of rotation. In another configuration, the cavity has an entrance, a top part of the entrance having the gripping area of the body at a top portion and the gripping surface of the hub as a bottom portion, and a bottom part of the entrance having a side opposite the gripping surface of the hub as a top and a surface of the body as a bottom portion, and wherein a strap may be fed through the bottom part of the entrance around the rotation point of the hub and out of the top part of the entrance. Optionally, as a strap that is fed through the bottom part of the entrance around the rotation point of the hub and out of the top part of the entrance is pulled out of the bottom part of the entrance, the hub will rotate towards the gripping area of the body and the gripping area and gripping surface will hold the strap. Alternatively, the hub includes a capture ring, the capture ring located radially away from the rotation point of the hub such that it is not located in the cavity, the capture ring shaped to receive the strap that is fed through the bottom part of the entrance around the rotation point of the hub. In one alternative, the gripping area and the gripping surface have raised protrusions to assist in gripping the strap. Optionally, the protrusions are teeth and the teeth are shaped to catch when the strap is pulled out of the bottom part of the entrance. Alternatively, the teeth are shaped to have a side perpendicular to the gripping surface of the hub on a first side and an obtuse angle to the gripping surface on a second side, the first side positioned to oppose the removal of the strap. In another configuration, the hub is spring loaded to stay proximate to the gripping area of the body. Optionally, the attachment area includes at least one bar and two apertures such that the strap may be wrapped around the attachment area.

In one embodiment, a method of using a flat strap holding apparatus includes providing a flat strap holding apparatus. The flat strap holding apparatus has a body and a rotating hub that rotates in an interior of the body, a gripping surface of the rotating hub proximate to a gripping area in the interior of the body. The rotating hub is configured to rotate towards and away from the gripping area. The method further includes positioning a strap through the interior of the body and around the hub, such that the strap passes between the gripping area and the gripping surface. The method further includes gripping the strap with the gripping area and the gripping surface. Optionally, the flat strap holding apparatus further includes an attachment area, and the method further includes attaching the strap in the attachment area, such that it passes through a plurality of apertures and over a plurality of bars in the attachment area and is held securely; and forming a loop with the strap based on the attaching and positioning. In one alternative, the flat strap holding apparatus further includes an attachment area, and the method further includes passing the strap through the attachment area, such that it passes through a plurality of apertures and over a plurality of bars in the attachment area, passing from a front of the flat strap holding apparatus to a back of the flat strap holding apparatus; and forming a loop with the strap and a first and second loose end based on the attaching and passing. In another alternative, the flat strap holding apparatus further includes an attachment area, and the method further includes passing the strap through the attachment area, such that it passes through a plurality of apertures and over a plurality of bars in the attachment area, passing from a back of the flat strap holding apparatus to the front of the flat strap holding apparatus, such that the flat strap holding apparatus is slidably attached to the strap. Optionally, the flat strap holding apparatus further includes an attachment area, and the method further includes attaching a second strap in the attachment area, such that it passes through a plurality of apertures and over a plurality of bars in the attachment area and is held securely.

In another embodiment, a flat strap holding apparatus includes a body and a rotating hub that rotates in an interior of the body. A gripping surface of the rotating hub is proximate to a gripping area in the interior of the body. The rotating hub is configured to rotate towards and away from the gripping area. The body has an attachment area, the attachment area having a plurality of apertures and a plurality of bars. The attachment area is located on a first side of the body, and the rotating hub and the interior are located on a second side of the body.

BRIEF DESCRIPTION OF THE DRAWINGS

FIG. 2a shows a perspective view of the body portion of the cam-strap device of FIG. 1;

FIG. 2b shows the underside of the body portion of the cam-strap device of FIG. 1;

FIG. 4a shows a side view of the spring portion of the cam-strap device of FIG. 1;

FIG. 4b shows a front view of the spring portion of the cam-strap device of FIG. 1;

FIG. 5a shows a front view of the center pin of the cam-strap device of FIG. 1;

FIG. 5b shows a side view of the center pin of the cam-strap device of FIG. 1;

FIG. 15 shows how to insert a strap into the attachment area of the cam-strap device of FIG. 6;

DETAILED DESCRIPTION OF THE DRAWINGS

Described herein are embodiments of a cam-strap device and methods of using it and making it. Some embodiments of cam-strap devices are comprised of a device housing or body, a hub which includes geometry forming a 'capture ring' on one the end of the hub, a pin which secures the hub within the housing and provides the means to allow the center hub to rotate, and a spring to induce the hub to a normally closed position.

Figure 1:
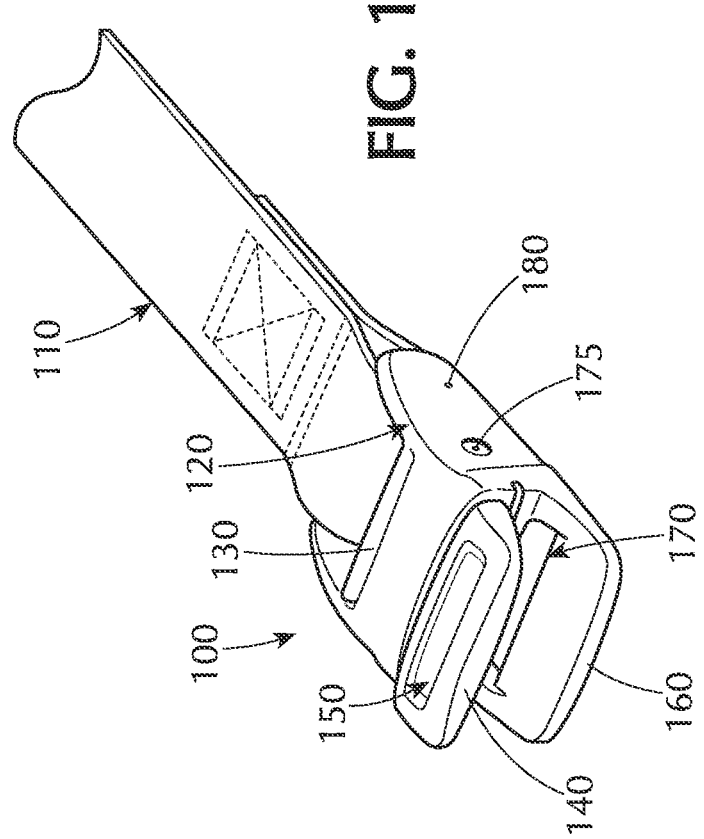
FIG. 1 shows an embodiment of a cam-strap device.

Essentially, two types of cam-strap devices are described herein. In a first type, the nylon (or other material) webbing is sewn around a bar at one end of the cam-strap device; and in the other type, the strap is not permanently affixed to the cam-strap device. Instead, a bar and receiving aperture is provided. A sewn embodiment is shown in FIG. 1. Cam-strap device 100 includes a permanently sewn and attached strap 110, which may be made of nylon flat strap webbing or other types of webbing. A loop 120 is formed in the strap 110 and attached to the underlying bar. A second bar may span the body 180 of the cam-strap device 100. A rotating hub 140 is included and includes an aperture 150 ('capture ring'). The area of interaction of hub 140 and body 180 of the device may be referred to as the 'hub capture area'. The rotating hub allows for receiving a strap to hold an additional end of a strap that may be inserted into the device 100. It also provides for cam tensioning of the strap. Front aperture 170 and pivot point 175 also are visible in this view.

FIGS. 2a and 2b show the body 180 with the rotating hub 140 removed. Bottom frame portion 160 includes an arrow that shows the user where to insert the flat strap. Open area 210 receives the pin and hub 140 that will be described in greater detail below. Bar 130 separates the rotating hub 140 area from aperture 220 which receives the sewn portion of a flat strap. Bar 230 holds the sewn loop of the flat strap. On the underside of the body 180, a gripping portion 240 is shown. This gripping portion 240 integrates with the gripping portion of the rotating hub 140 to hold the flat strap.

Figure 3B:
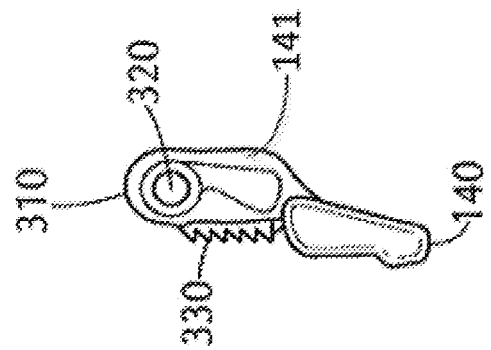
FIG. 3b shows a side view of the hub portion of the cam-strap device of FIG. 1.
Figure 3A:
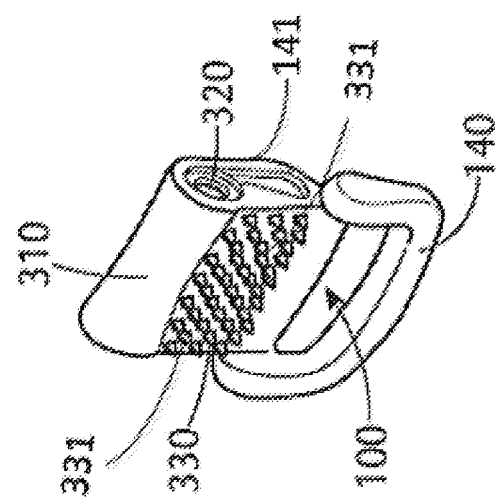
FIG. 3a shows a perspective view of the hub portion of the cam-strap device of FIG. 1.

FIGS. 3a and 3b show rotating hub 140. Rotating hub 140 includes an arm 141 with a gripping surface 330 that extends from the arm 141 that is nearly tangential to the hub 140. The arm 141 extending tangentially from the hub 140 has a plurality of raised protrusions 331 which extend substantially perpendicularly from the arm 141 toward the gripping portion 240 on the underside of the body 180. Aperture 310 receives the pin 510 described below and rotates within the body. Carve-out 320 is designed to receive the spring arm 440, so that the spring may hold the rotating hub 140 in position. Optionally, in some embodiments, the spring may be omitted.

FIGS. 4a and 4b show spring 410. Spring 410 includes an aperture for receiving pin 510, a first spring arm 430, and a second spring arm 440. Spring arm 440 is sized to be received by carve-out 320 in rotating hub 140. Spring arm 430 is sized to interface with the interior of body 180. Coil portion 450 provides for resistance to keep rotating hub 140 in place.

FIGS. 5a and 5b show pin 510. Pin 510 includes a plurality of protrusions, designed to provide for a friction fit when integrated with hub 140.

Figure 6:
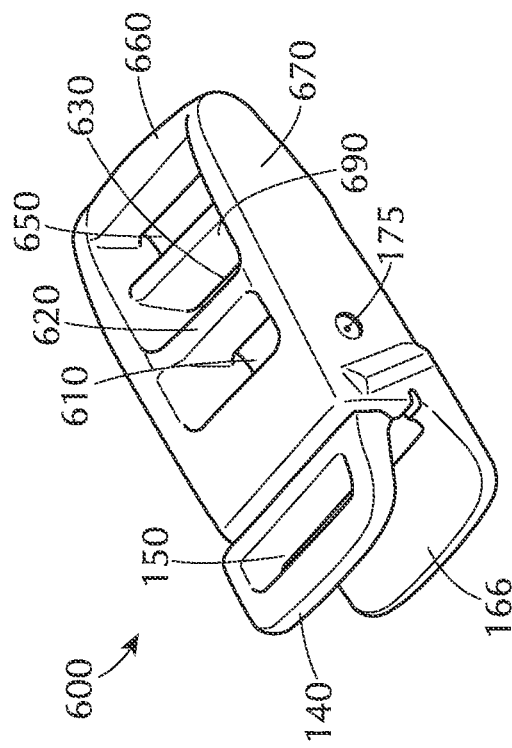
FIG. 6 show another embodiment of a cam-strap device.

FIG. 6 shows an alternative embodiment of the cam-strap device 600. In this embodiment, the strap is not permanently attached to the cam-strap device 600. Instead, additional bars and apertures are provided, so that a strap may be releasably attached. Body 670 of cam-strap device 600 includes a first receiving area 610, where rotating hub 140 and pin 510 are placed, in addition for providing room for a flat strap to be wrapped around the rotating hub 140. Bar 620 is part of the loose strap attachment portion as is aperture 610 which also serves as part of the cam portion aperture. Aperture 630, bar 640, aperture 650, and bar 660 make up the attachment area for loose straps. These apertures and bars may have similar shapes and angles to those found in tension locks. In many cases, the bars also may have teethed or gripping surfaces on faces of the device.

Figure 7:
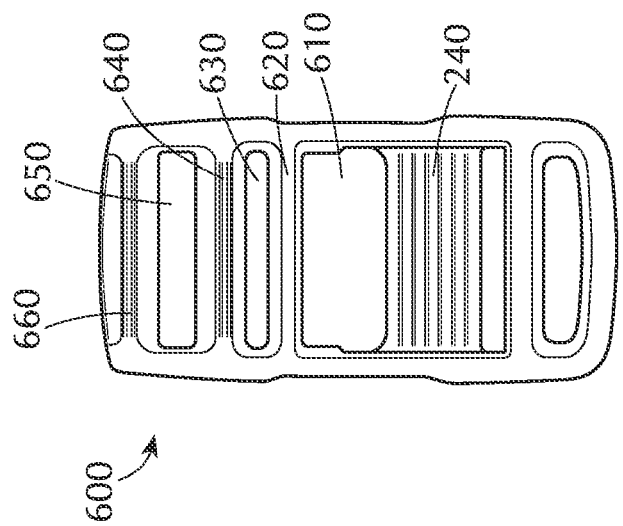
FIG. 7 shows the underside of the body portion of the cam-strap device of FIG. 6.

In FIG. 7, the gripping surfaces described above are apparent. Similar to cam-strap device 100, cam-strap device 600 also includes gripping portion 240 for interfacing with the rotating hub 140.

The cam-strap device 100 and webbing may provide an adjustable means to secure flat strap (webbing) either in a closed-loop configuration or in a point-to-point configuration—Image Page 2. Contained within both the hub 140 and the body 180 are grip geometries that aid in securing the flat strap in the device. Note also that the pin 510, in securing the hub 140 to the body 180, can either be fixed to the hub, in which case it will rotate with the hub in the housing, or swaged to the housing, allowing the center hub to freely rotate about the swaged pivot pin. In many of the embodiments shown here, the pin is fixed to the hub rotating with the hub within the body.

Another embodiment omits the use of a spring 410. Note that, unlike many other cam-lock designs, the use of a torsion spring is not required for the embodiments described herein to function. The inclusion of a torsion spring aids in clarifying for the user where to insert the webbing when initially configuring the device. The motion of a strap towards the pivot point of the hub 140 on the top side of hub 140 (the side that has gripping area 330) will cause the hub to close. This movement of the strap in relation to the gripping portion 240 and the gripping area 330 and over the body portion 180 surrounding aperture 310 will cause the hub 140 to rotate and close in relation to gripping portion 240, thereby securely holding the strap from slipping.

As shown in FIG. 1, a flat strap is sewn onto one end of the housing permanently attaching the flat strap to the device. In other embodiments, the housing is constructed in such a way as to allow a flat strap to be attached to the housing in a fixed manner similar to being sewn, yet would still remain removable from the device as shown in FIG. 6. In other alternatives, the cam-strap device may be otherwise fixed in place. The end opposite hub 140, instead of having a sewn strap or an attachment point for a strap, may have another anchor, such as a carabineer, chain, or other fixed attachment device. This same embodiment enables the device to be secured to a flat strap anywhere along its length thereby creating the possibility of adding 'device-locking capability' at any point on the flat strap (see FIG. 19). A particular flat strap may already be involved in securing a load and may have a permanently attached device that is consumed in securing the load. Having the ability to add another locking device allows any unused portion of the flat strap to be utilized in securing additional loads.

Figure 21:
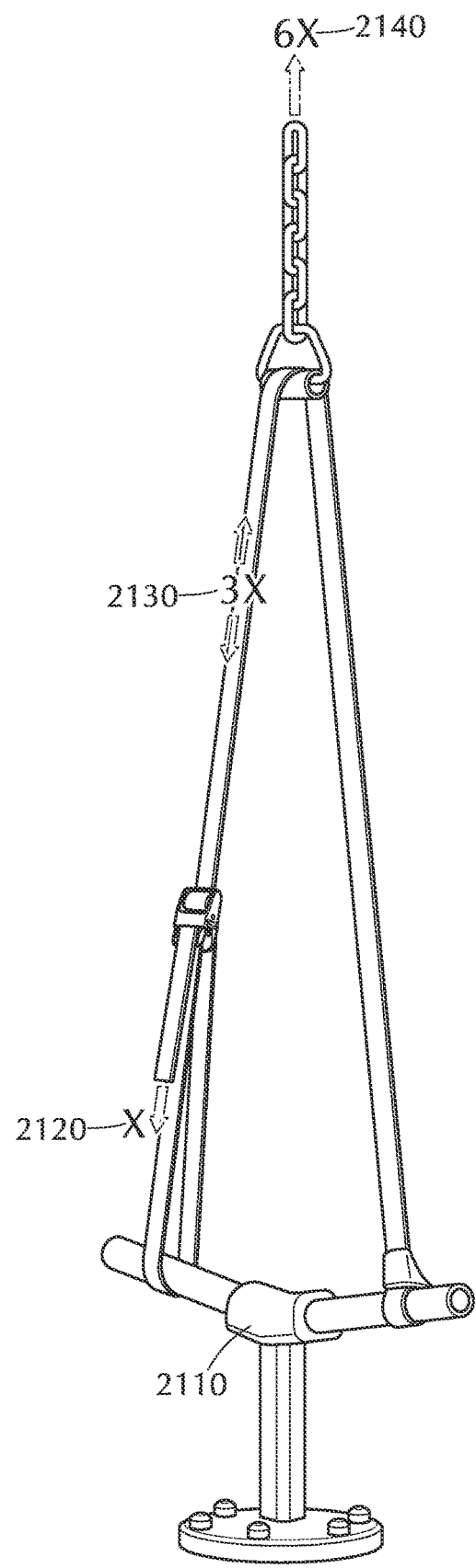
FIG. 21 shows the mechanical advantage that may be provided by the cam-strap device of FIGS. 1 and 6.

In either the closed-loop or the point-to-point configurations, the user is afforded an option to configure the device in such a manner as to provide a 3-to-1 mechanical advantage when tightening the flat strap within the device (see FIG. 21). A 3-to-1 mechanical advantage would enable the device to assert 300 lbs. of force to an anchor point, yet require only 100 lbs. of tensioning force be applied in drawing the flat strap through the cam-strap device. This makes the device comparable in function to more involved ratchet type devices. For ratchet devices designed to work with flat straps of sizes comparable with those used by the cam-strap device described here, the 'maximum working load specifications' for many of those ratchet devices are well below the capabilities of this device. Note the 3-to-1 mechanical advantage is an 'ideal limit', and any frictional forces that arise in the process of tightening the flat strap would reduce the actual amount of amplified leverage.

To configure the flat strap in the cam-strap device 100, the free end of the flat strap is inserted into the cam-strap device between the bottom frame portion 160 and the back side of the hub 140. The flat strap then is directed around the hub 140 and reinserted back into the adjustable opening formed between the front of the hub 140 and the body 180 (see FIG. 11).

The cam-strap device constrains the flat strap by means of a clamping force directed into the flat strap resulting from the rotation of the hub 140 toward the underside front surface of the body 180 (i.e., toward the closed position) where gripping portion 240 is located. Grip geometries on both the hub 140 and the underside front surface of the body 180 concurrently fill the gap occupied by the flat strap. Any movement of the flat strap to back out of the cam-strap device 100 will induce rotation of the hub 140 toward a closed position.

The flat strap can be drawn through the cam-strap device any time a tensioning force applied to the free end of the flat strap exceeds the loading force of the flat strap held within the cam-strap device 100. The cam-strap device 100 functions in a directional manner. If the user-applied tensioning force is removed from the cam-strap device 100 (the user releases the free end of the flat strap), the cam-strap device 100 will hold the flat strap in place, preventing movement of the flat strap back through the device irrespective of the loading force on the flat strap.

The flat strap can be withdrawn from the cam-strap device by rotating the hub about the pin in such a manner as to move the grip geometry integrated in the center hub away from the grip geometry integrated in the housing. The torque advantage produced by specific geometries of the center hub 140, particularly the distance the capture ring geometry resides from the pivot pin axis, enables the user to rotate the center hub 140 irrespective of the amount of tension in the flat strap. Note the only movement available to the hub 140 (which is constrained within the housing by the pivot pin) is rotation about the pivot pin axis. The rotation of the hub 140 results in either an increase or a decrease in the gap distance between the grip geometries of the center hub 140 and the grip geometries of the housing 180. The direction of rotation of the hub 140 determines whether the change in gap distance is one of increase or one of decrease. Additionally, the design of the cam-strap device 100 is such that, as tension in the flat strap increases on the load-bearing side of the device, the holding (or clamping) force generated by the induced rotation of the hub 140 increases in a like manner.

There are provisions in the cam-strap device 100 that allow the free end of the flat strap (the non-load bearing portion) exiting the primary grip area to be routed back through the device such that the release of the flat strap by the rotational movement of the center hub 140 as described in the paragraphs above is prevented. This provides a means to lock the flat strap in the device minimizing the possibility of an inadvertent release of the flat strap from the device.

In a no-load (or slack) condition—particularly pertinent for the embodiments that do not incorporate a separate spring (torsion or otherwise) to induce the effect of closure—initial closure is achieved by the interplay of the flat strap and device geometry residing on the back side of the hub 140. The hub 140 back side geometry interacts with the flat strap such that any attempt to withdraw the flat strap from the device results in a rotation of the center hub 140 in the direction of closure. As the hub 140 begins to rotate toward closure, a resultant clamping force is directed into the flat strap. If more force is applied to withdraw the flat strap from the device, higher clamp forces are generated preventing any further movement of the flat strap back through the cam-strap device 100.

As noted above, in a no-load (or slack) condition, any attempt to withdraw the flat strap back through the cam-strap device 100 will result in an initiation of hub rotation in the closing direction. This 'withdrawal induced closure' effect can be mitigated by simply pressing on hub 140 near aperture 150 in such a manner as to induce a center hub rotation in the opposite direction, one that releases or eliminates the clamping force.

The capture ring geometry integrated into the hub 140 serves three primary purposes: to mitigate the impact of a high-load release, to provide a means to dress the free end of the flat strap after it exits the cam-strap device 100, and finally to assist the housing cross bars in preventing inadvertent release of the flat strap from the cam-strap device 100. Note that, if the flat strap is routed through the capture ring geometry on the hub 140 (without also being routed around the housing cross bars), the flat strap can be drawn through or released from the device in a manner identical to that described above. The capture ring geometry does not prevent the drawing of the flat strap through the cam-strap device 100 or the release of the flat strap from the cam-strap device 100. However, it will slow the release rate of the flat strap when the center hub 140 is rotated to an open position while the flat strap is sustaining high loads. The capture ring geometry diminishes the 'explosive release' commonly experienced with other cam-lock style devices when those devices are released while sustaining similar loads.

Note also the flat strap can be withdrawn from the hub capture ring geometry without impacting the center hub's ability to secure the flat strap in the cam-strap device 100.

The complimentary shape of the surfaces from which the grip geometries extend in both the hub 140 and in the body 180 are such that an 'area of contact' between the grip geometries is created rather than a 'line of contact' as is typical in other cam-lock devices. This 'area of contact' enables the device to accommodate contact irregularities in a more forgiving manner than 'line of contact' devices and, thus, assures adequate clamping forces at higher loads. Additionally, distributing the clamping force over a greater area of the cam-strap device 100 reduces localized stresses in the flat strap—which in other designs may lead to catastrophic failure of the flat strap. In this design, the larger contact area also reduces peak or spot loading which results in a reduction of the reactive forces encountered when the flat strap is released at higher loads.

The generous diameter and 'saddle shape' of the axial portion of the hub 140 have a centering effect on the flat strap as it is drawn through the cam-strap device 100 and minimizes localized stresses on the flat strap, particularly at high loads. These features enable the flat strap to safely sustain higher loads as compared to other designs using an identical flat strap. Cam-lock designs that bend the flat strap through a relatively sharp transition (for example, over a stamped edge of metal) create highly localized stresses in the flat strap. This in turn can lead to premature failure of the flat strap, thus limiting the load bearing capacity of the device.

Note there are system level configurations (comprised of device, flat-strap, and anchor points) that can easily and safely support loads exceeding the rated capacity of the flat-strap or configurations where the force amplification capability specific to the cam-strap device can be enhanced, such as in FIGS. 22 and 23a-23c. Particular attributes of the embodiments described herein enable such configurations that, while not exclusively intended for those purposes, provide unique capabilities not available in other cam-lock or ratchet type designs. Therefore, when examining rated capacities of a particular embodiment—such as those described here or others—system level configurations may be important. The embodiments described herein are unique in the industry in terms of enabling system level capabilities that are greater than specific device or embodiment-only capabilities.

Finally, the center hub 140 can be finished in a variety of colors. Allowing a particular color to signify a particular length of flat strap provides a means to color code finished assemblies based on the strap length sewn to them. Furthermore, colored tags may be attached to various strap lengths.

Figure 8:
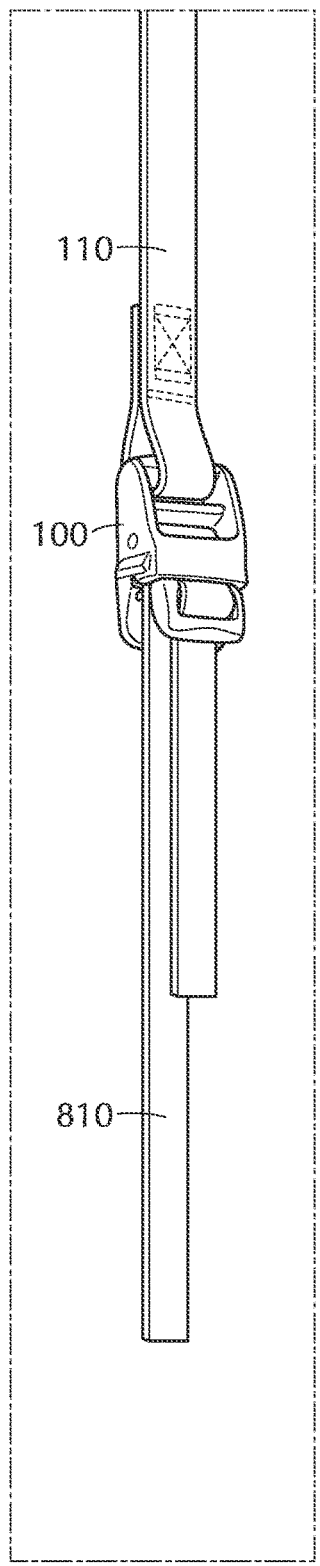
FIG. 8 shows the cam-strap device of FIG. 1 in use.
Figure 9:
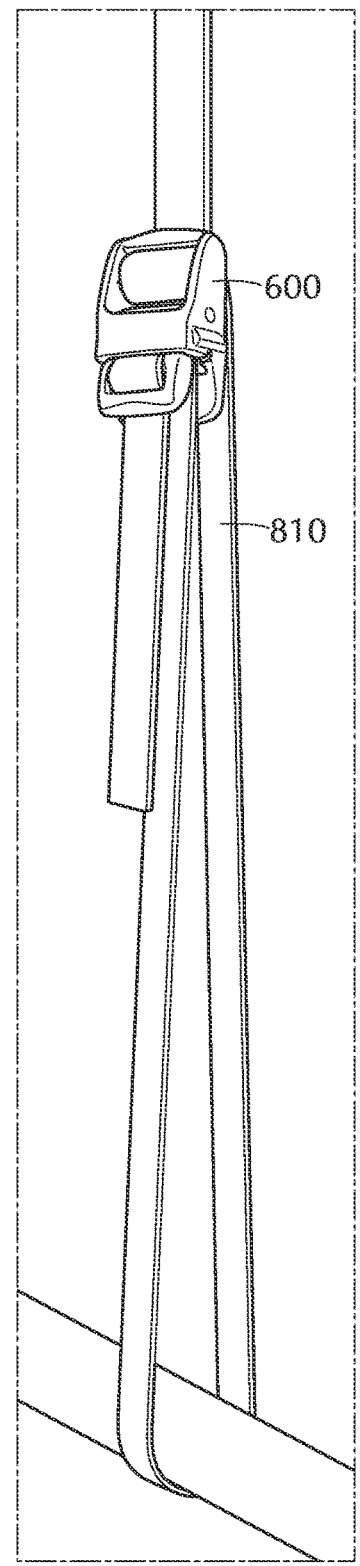
FIG. 9 shows the cam-strap device of FIG. 6 in use.

FIGS. 8 and 9 show cam-strap device 100, 600 deployed in a standard configuration. As shown, cam-strap device 100 includes sewn strap 110, and loose strap 810 fits into the hub capture area to hold the loose strap 810. In FIG. 9, the loose strap 810 fits through the attachment area including aperture 610, bar 620, aperture 630, bar 640, aperture 650, and bar 660.

Figure 10:
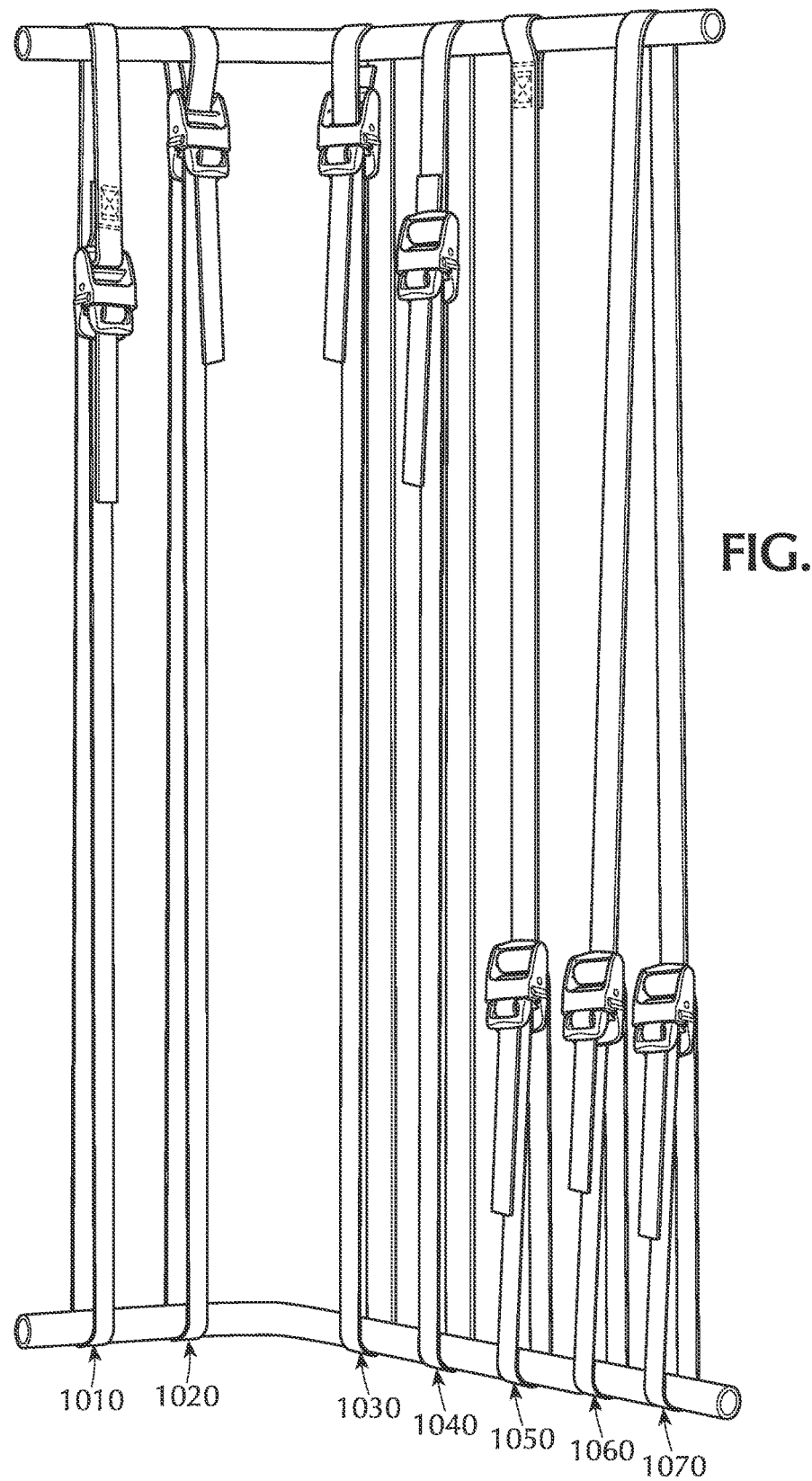
FIG. 10 shows multiple cam-strap devices in use.

FIG. 10 shows multiple configurations of the cam-strap device 100. Strap setup 1010 shows the cam-strap device 100 in standard configuration forming a loop. Strap setup 1020 shows the cam-strap device 100 in a FIG. 8 configuration where the strap is run through the front of the cam-strap device 600. Strap setup 1030 shows the cam-strap device 600 in a figure-8 configuration where the cam-strap device 600 is oriented on the strap and may be slid up and down the strap. Strap setup 1040 shows the cam-strap device 600 in a loop configuration. Strap setup 1050 shows the cam-strap device 600 utilizing a strap with a fixed end and the strap running through the cam-strap device attachment area and looping back to the hub capture area. Strap setup 1060 shows two cam-strap devices 600, both having the strap running through the cam-strap device attachment area and looping back to the hub capture area.

Figure 11:
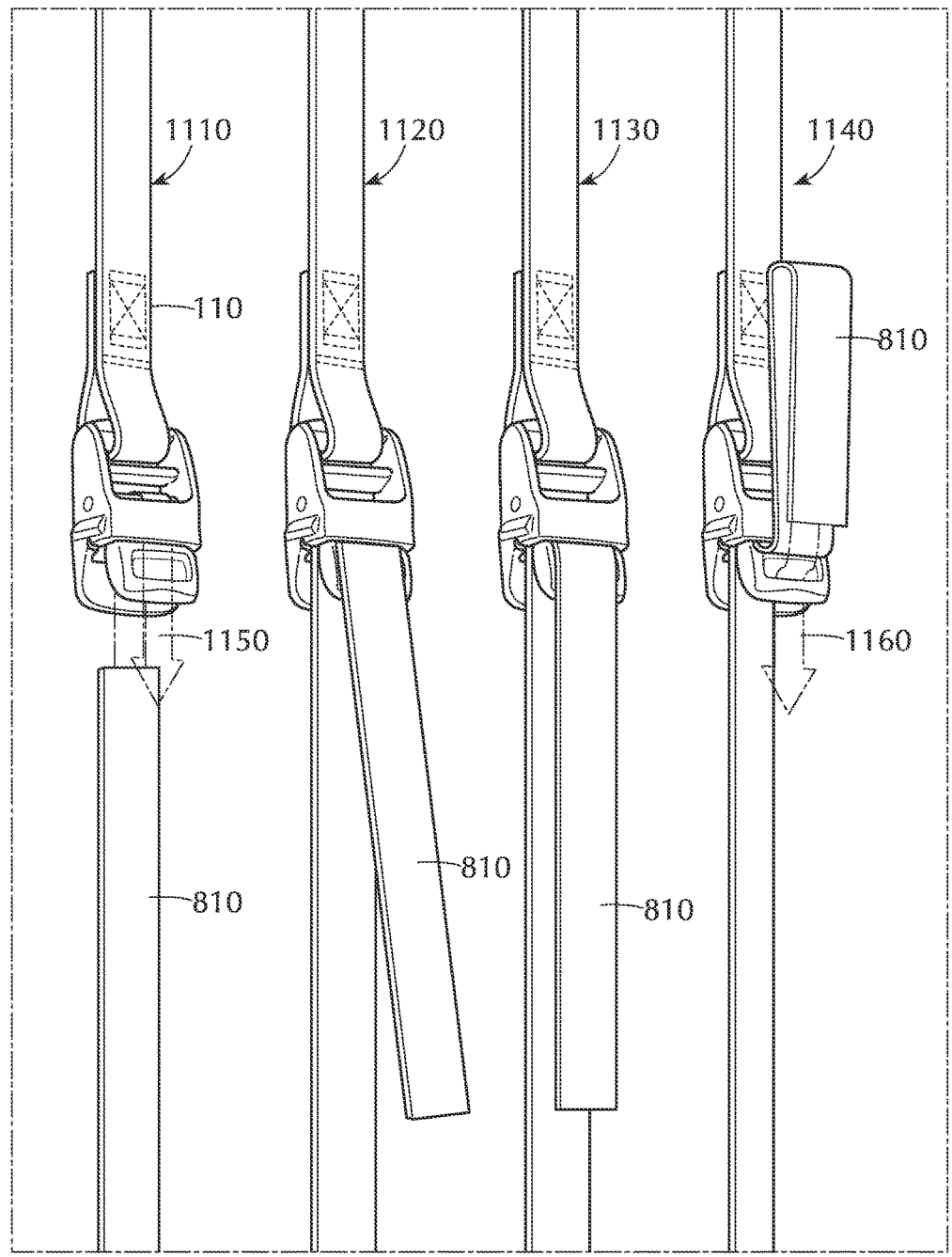
FIG. 11 shows how to insert a strap to utilize the cam end of the of the cam-strap device of FIG. 1.

FIG. 11 shows the basic process for putting a strap in the hub capture ring. In view 1100, a cam-strap device 100 having a sewn strap end 110 is provided with another strap 810. Arrow 1150 shows how the strap fits through the hub capture area. View 1120 shows the strap after being placed through the hub capture area. In view 1130, the strap is aligned and pulled to properly tension the strap. The strap then is placed through the aperture 150 or capture ring in view 1140 following arrow 1160. This engagement method may equally be used for cam-strap device 600.

Figure 12:
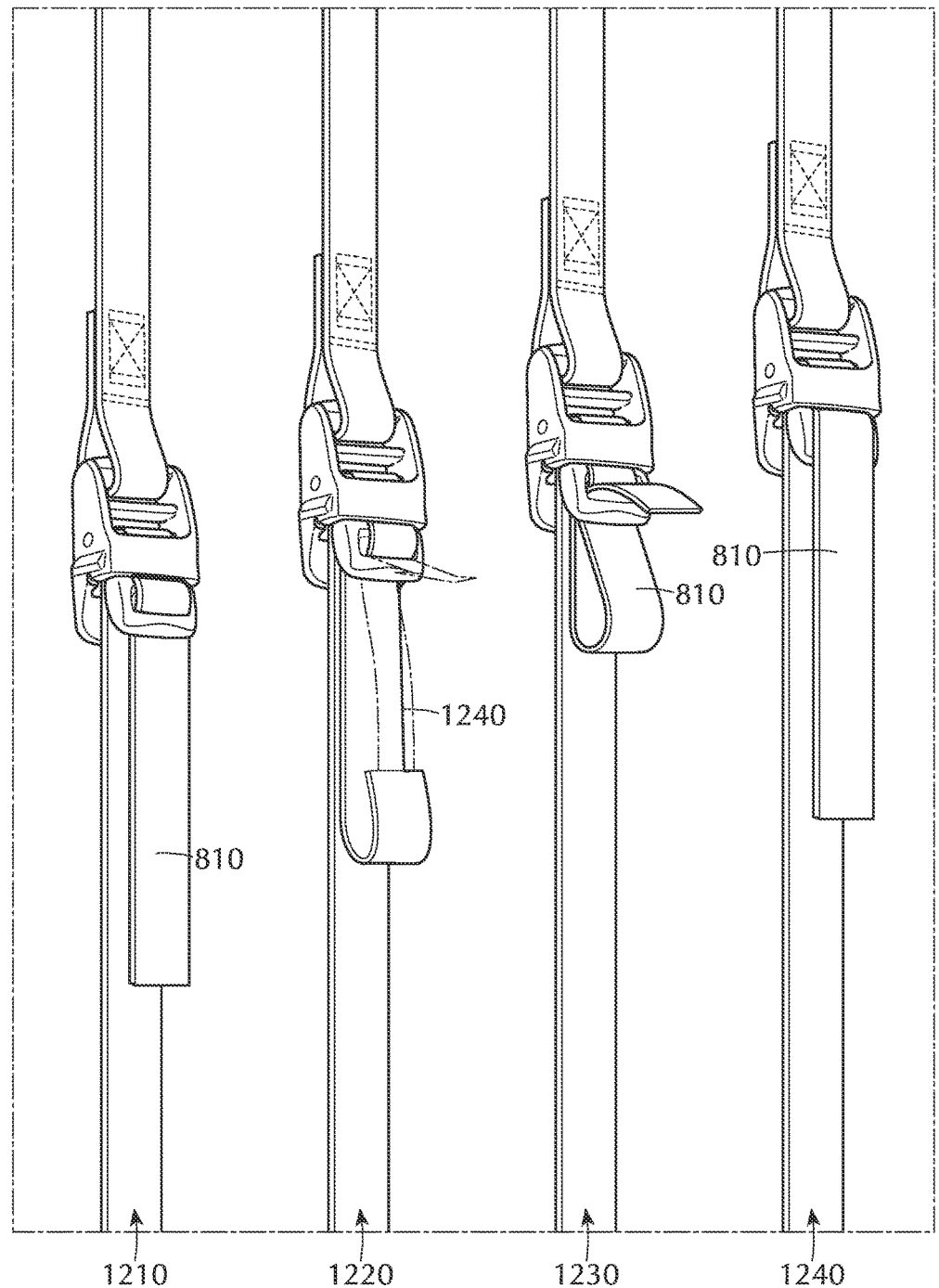
FIG. 12 shows how to release a strap to utilize the cam end of the of the cam-strap device of FIG. 1.

FIG. 12 shows views of the method of releasing the strap from the capture ring without releasing the cam starting from view 1210 where the strap 810 is fully engaged. In view 1220, the loose end of the strap 810 is taken and passed back through the capture ring as shown in view 1230. The release is finished in view 1240 where the strap 810 has been completely removed from the capture ring.

Figure 13:
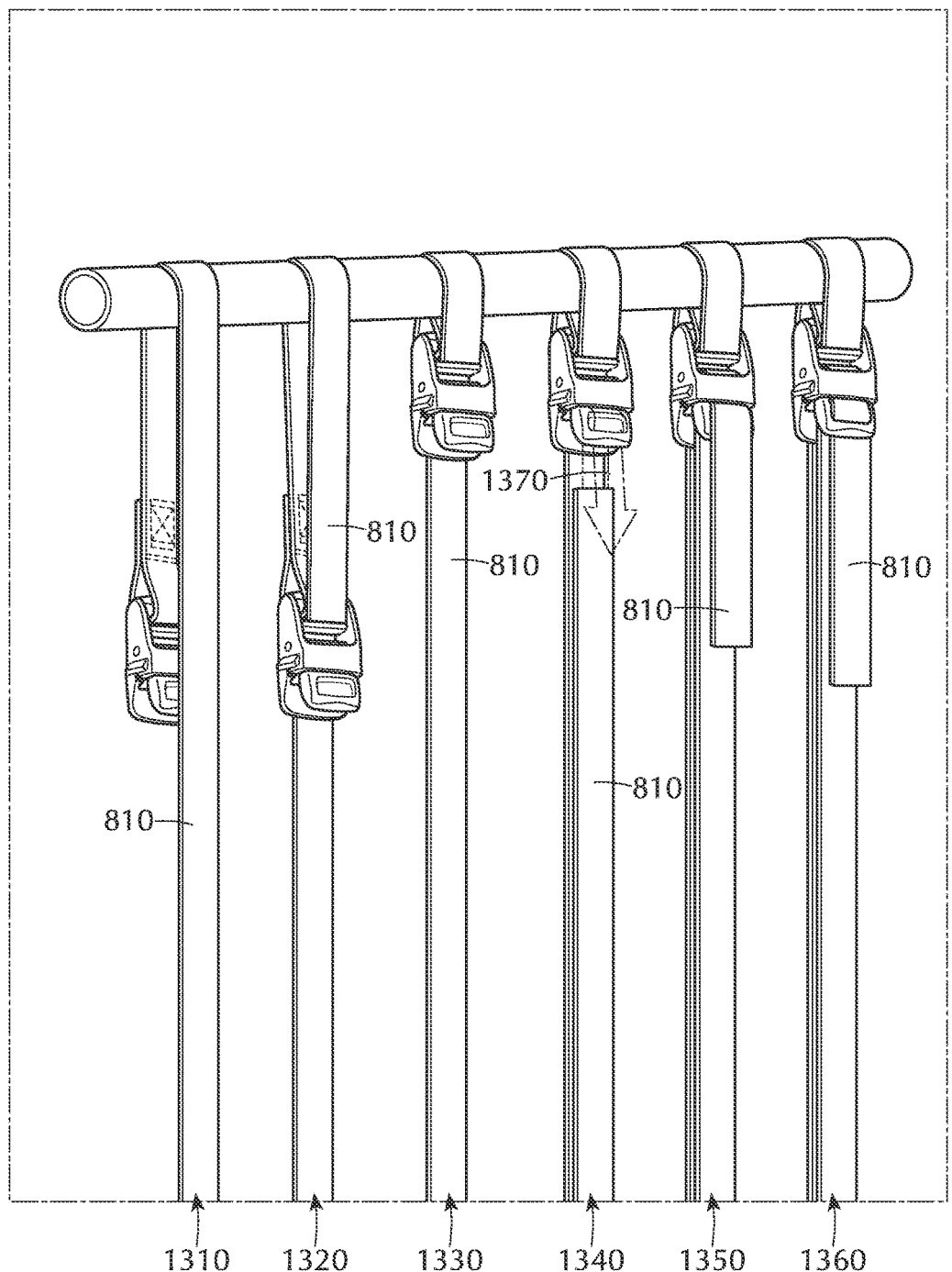
FIG. 13 shows a how to create a FIG. 8 configuration with the cam-strap device of FIG. 1.

FIG. 13 shows the process for making a figure-8-type arrangement with a cam-strap device 100. In view 1310, the strap 810 is looped around a fixed point. In view 1320, the strap 810 is passed through the attachment area and passed out of the back of the cam-strap device 100. The strap 810 then may be looped around another fixed point in view 1330 and fed back to the cam-strap device 100 in view 1340 where it is placed through the hub capture area according to arrow 1370.

Figure 14:
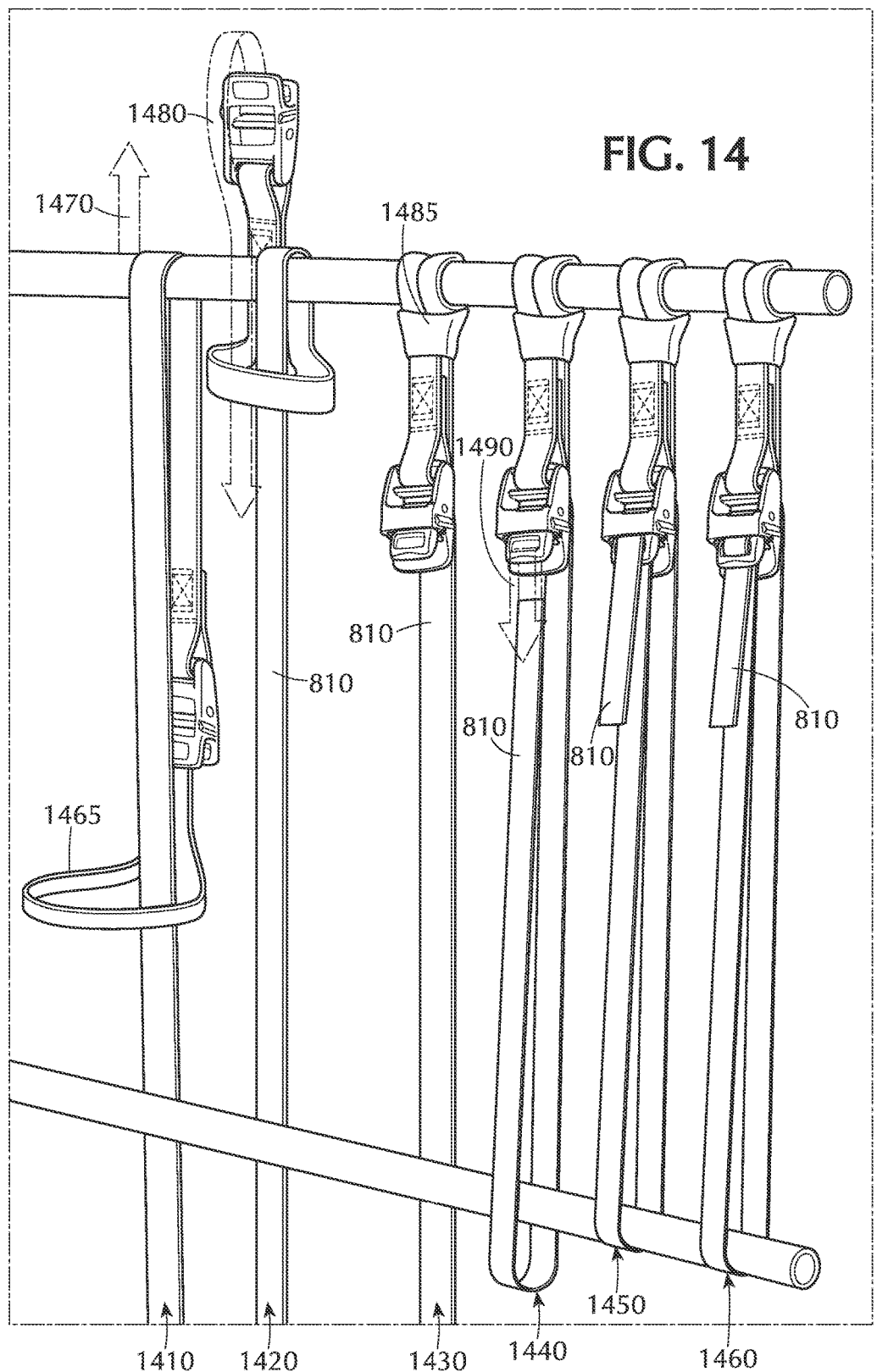
FIG. 14 shows how to create a loop configuration with the cam-strap device of FIG. 1.

FIG. 14 shows various views of a strap 810 looped around itself. Views 1410 and 1420 show the creation of a loop 1465 that is slid up in direction 1470 and then the completion of the loop by running the strap 810 back through according to arrow 1480. After forming the holding loop 1485, the strap may be looped around another fixed point and run back through the cam-strap device 100 according to arrow 1490 as shown in views 1430-1460.

FIG. 15 shows a method of inserting a strap 810 into a cam-strap device 600. The strap 810 is run through the attachment area including aperture 630, bar 640, aperture 650, and bar 660, according to arrow 1510.

Figure 16:
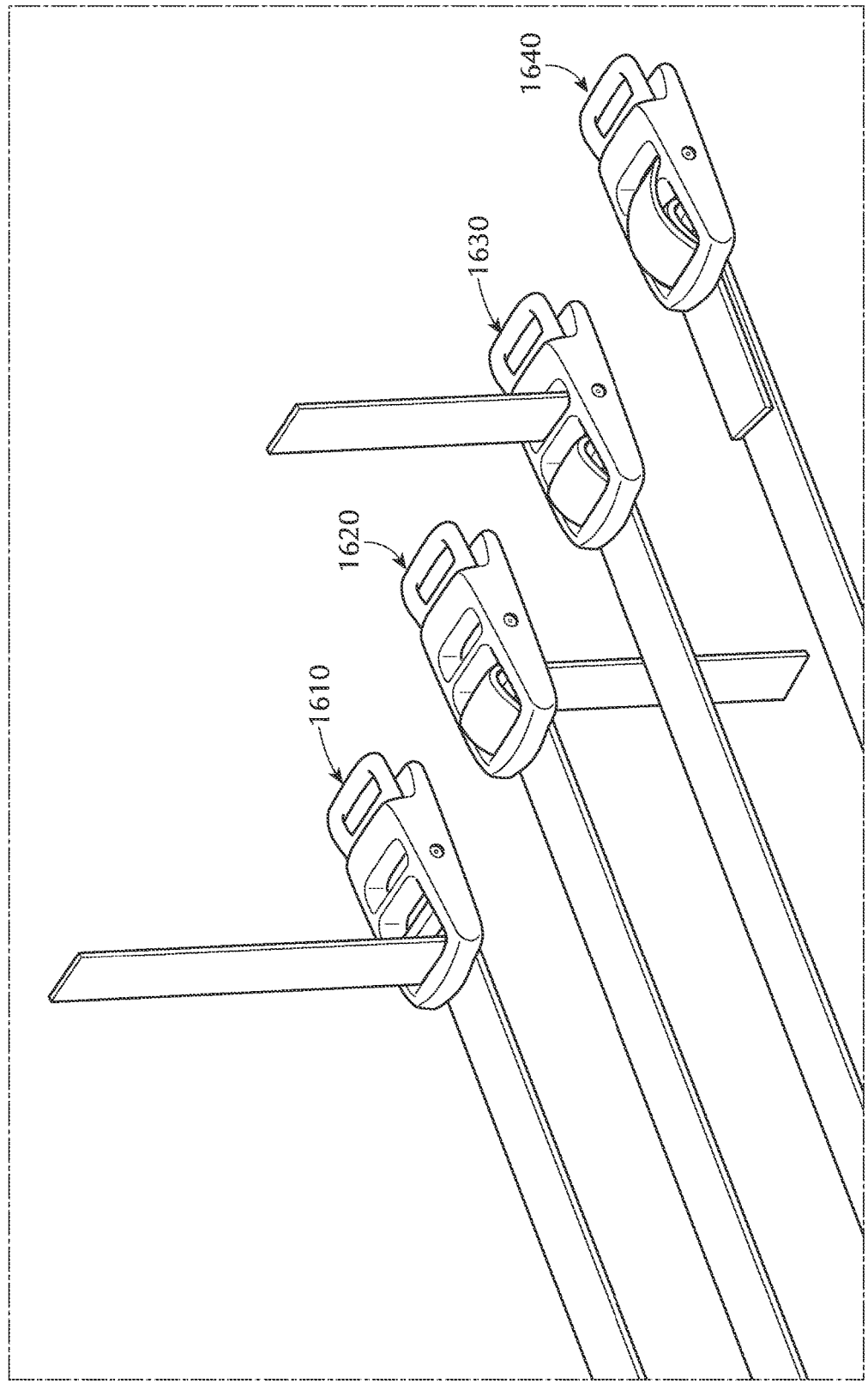
FIG. 16 shows how to insert a strap into the attachment area of the cam-strap device of FIG. 6.

FIG. 16 shows an additional configuration for the strap 810 in the attachment area including aperture 630, bar 640, aperture 650, and bar 660. Essentially, in views 1610-1640, the strap 810 is run up through aperture 650 and down around bar 690, around bar 620, and then under bar 660 via aperture 650.

Figure 17:
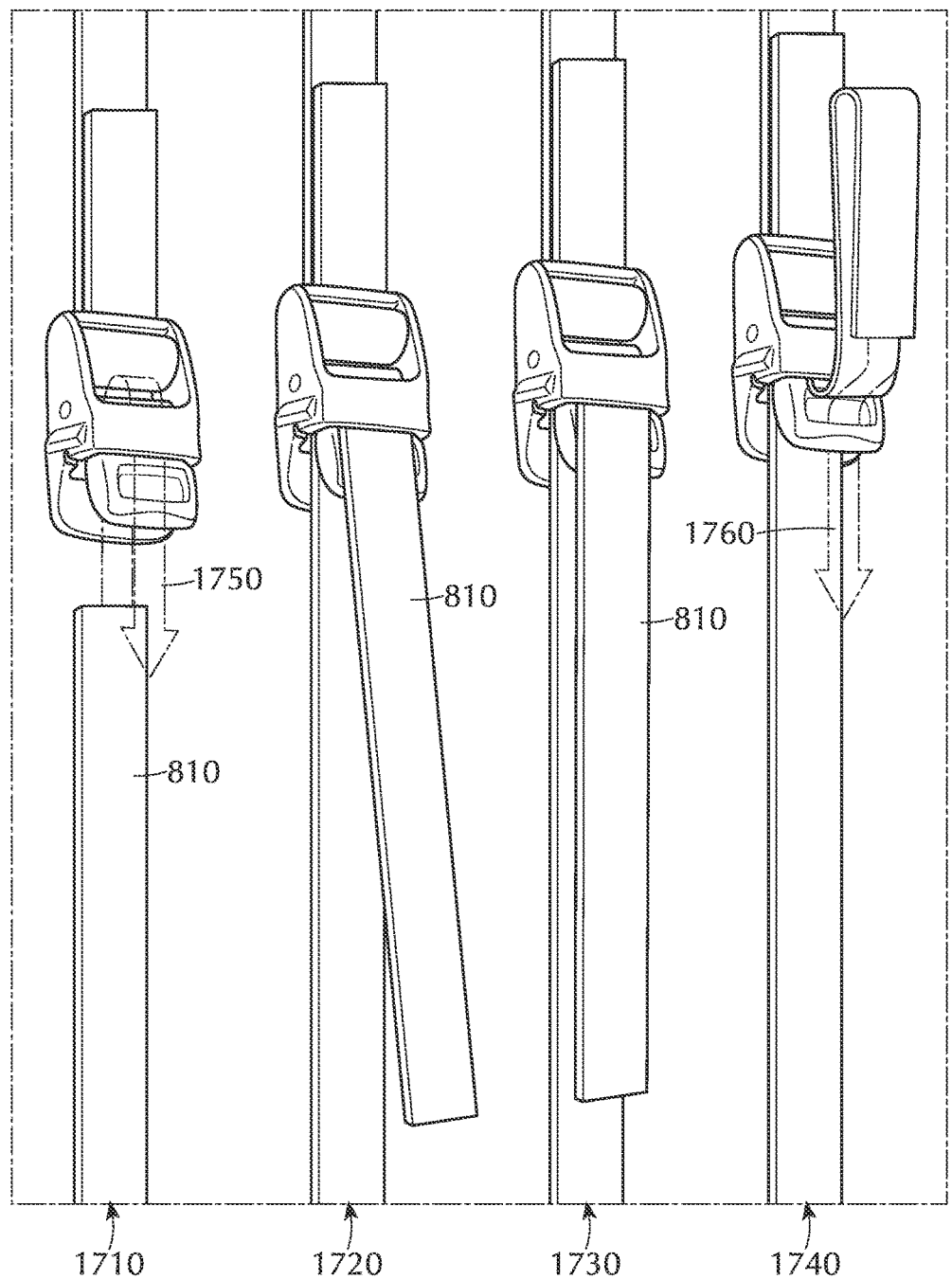
FIG. 17 shows how to insert a strap into the cam area of the cam-strap device of FIG. 6.

FIG. 17 shows the basic process for putting a strap 810 in the hub capture area. In view 1700, a cam-strap device 600 is provided with strap 810. Arrow 1750 shows how the strap 810 fits through the hub capture area. View 1120 shows the strap 810 after being placed through the hub capture area. In view 1130, the strap 810 is aligned and pulled to properly tension the strap 810. The strap 810 then is placed through the aperture 150 or capture ring in view 1140 following arrow 1760.

Figure 18:
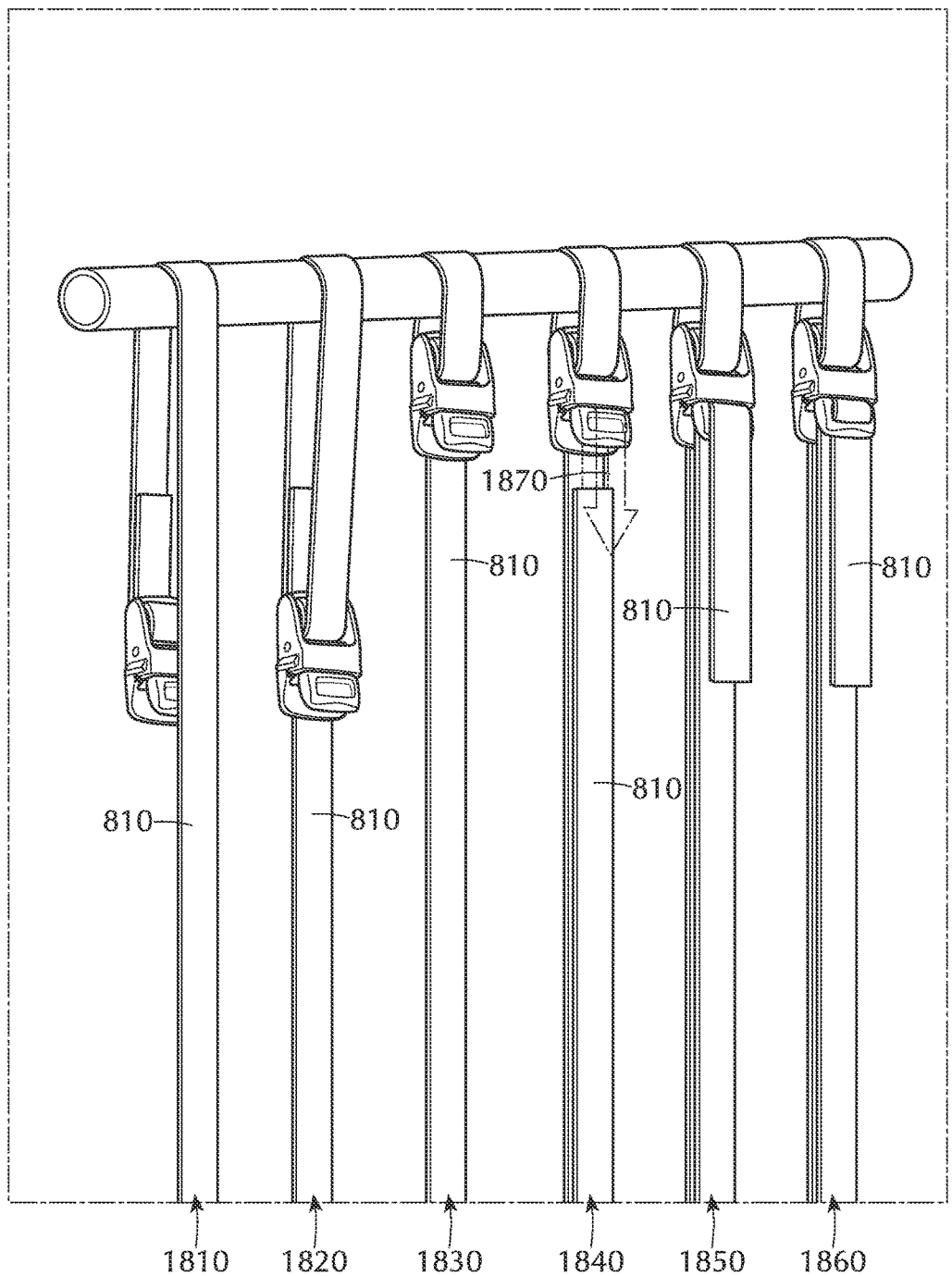
FIG. 18 shows how to create a FIG. 8 configuration with the cam-strap device of FIG. 6.

FIG. 18 shows the method of creating a figure-8 configuration with cam-strap device 600. In view 1810, the device is looped around a fixed point. In view 1820, the down end is run back through the cam-strap device 600, through the attachment area, and out the back of the device. The cam-strap device 600 then may be slid up the strap 810 as in view 1830. It then may be looped around another fixed point (not shown) in view 1840 and looped back through the cam-strap device 600 according to arrow 1870 and finished as shown in views 1850-1860.

Figure 19:
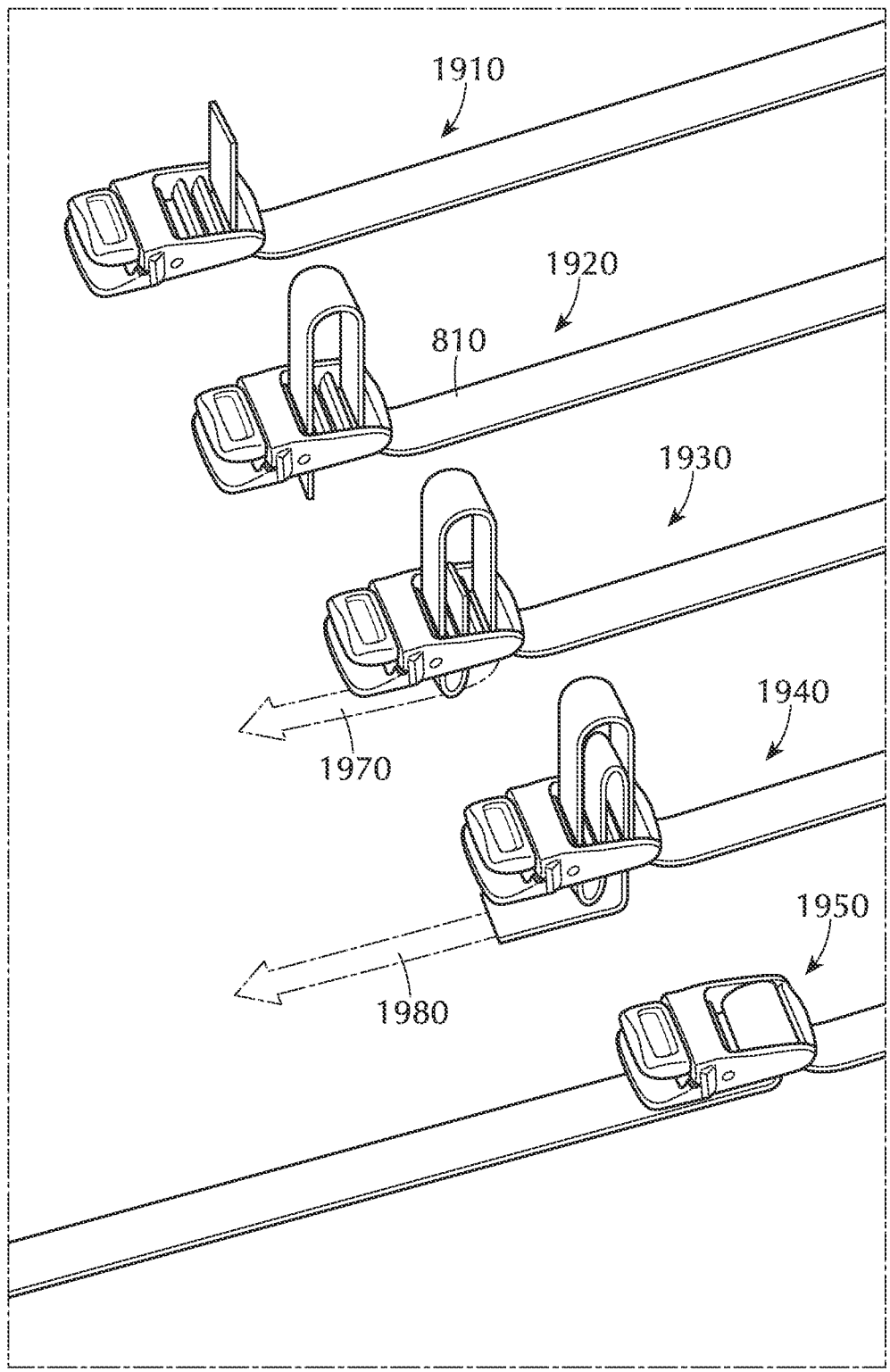
FIG. 19 shows how to put the cam-strap device of FIG. 6 on a strap.

FIG. 19 shows a method of mounting the cam-strap device 600 on a strap 810 in views 1920-1950. Essentially, the strap 810 is placed under bar 660 and passed up through aperture 650. It then goes down aperture 610 and around bar 620, up through aperture 630, around bar 690, and down through aperture 650, and pulled in direction 1970, 1980.

Figure 20:
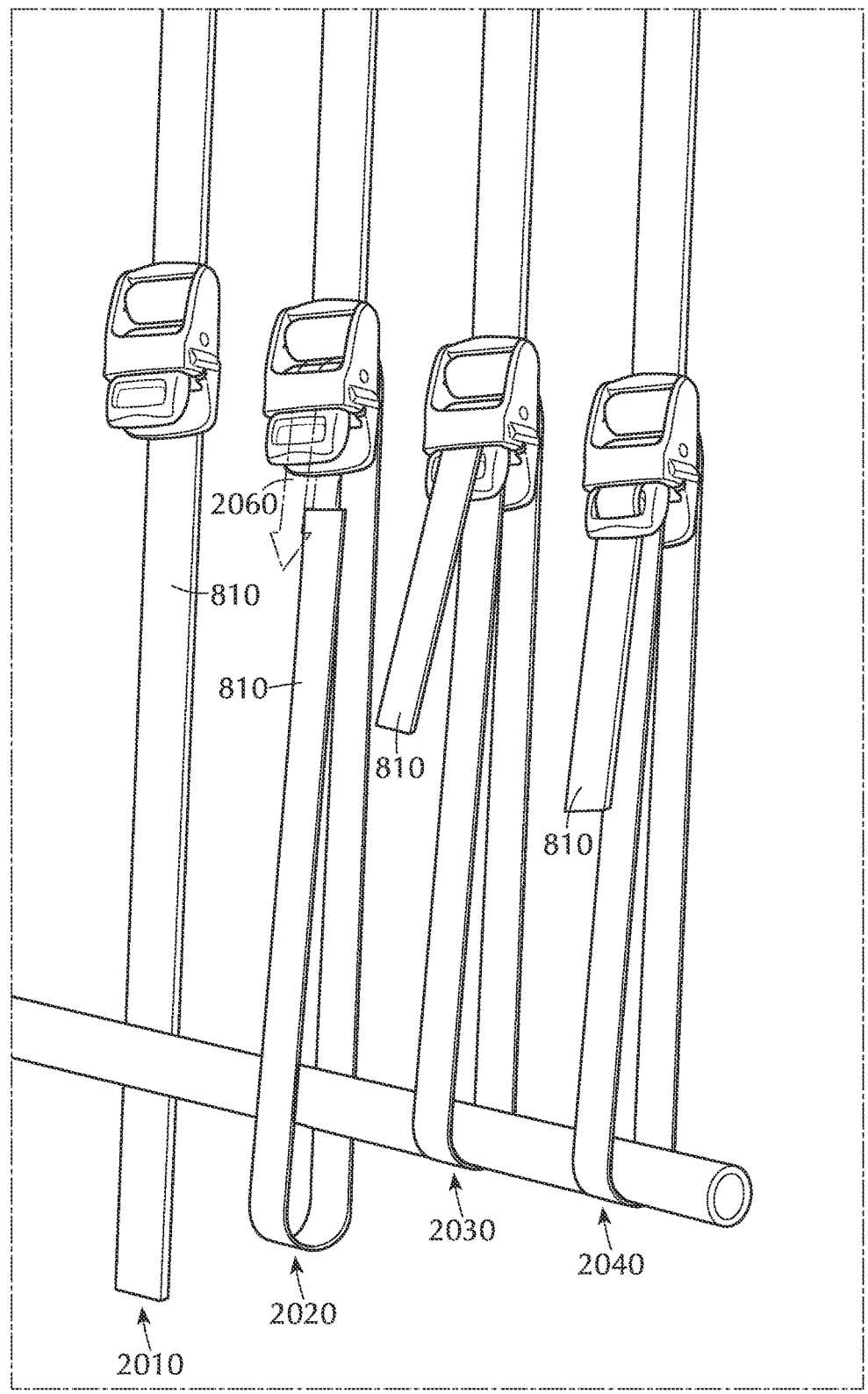
FIG. 20 shows how to attach the cam-strap device of FIG. 19 to a fixed point.

The cam-strap device 600 configured in FIG. 19 then may be used according to that as shown in FIG. 20. In views 2010, 2020, the strap 810 is looped around a fixed point and then passed through the cam-strap device 600 according to arrow 2060. The attachment is finished as shown in views 2030, 2040.

FIG. 21 shows the mechanical advantage that can be gained from the cam-strap device 600 through proper configuration. Essentially, the user gains a times-three advantage (not including reductions for friction) for force applied in direction 2120 as compared to direction 2130. By attaching the cam-strap device 600 at two points on fixed item 2110, the user may actually gain a times-six advantage in direction 2140.

Figure 22:
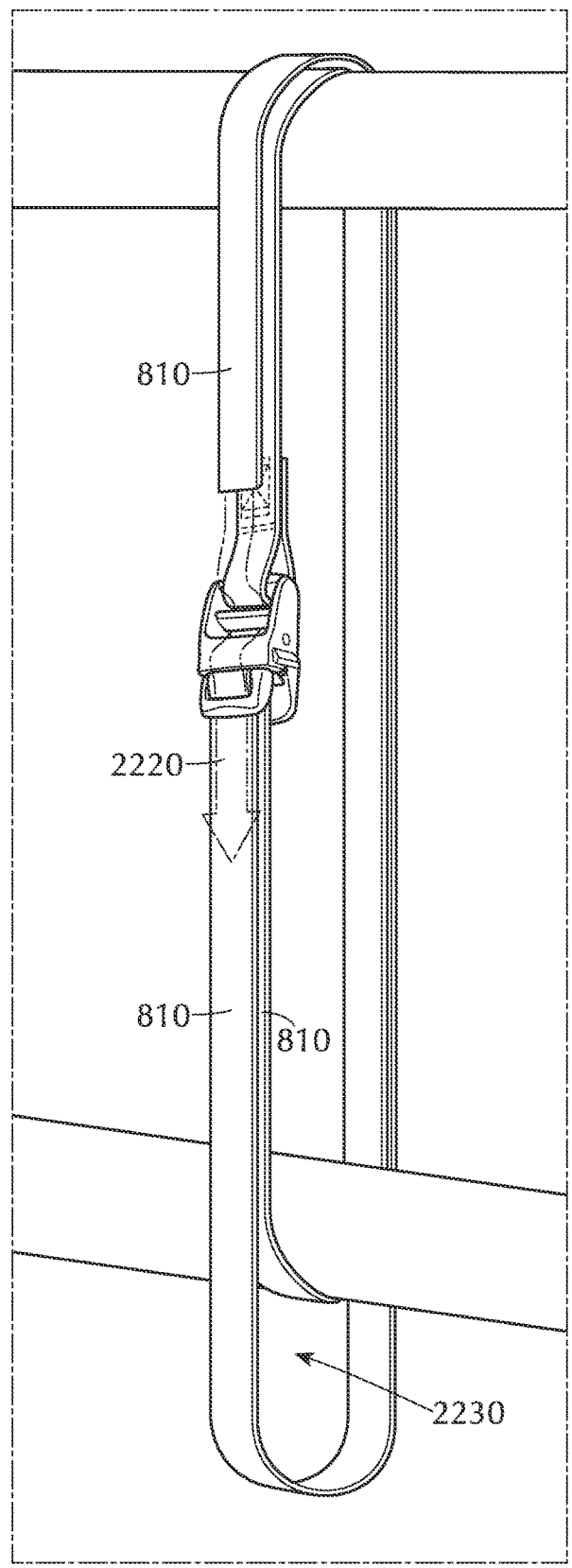
FIG. 22 shows how to more securely lock the strap to create a doubled configuration that can produce a 3 to 1 mechanical advantage with the cam-strap device of FIG. 1.

FIG. 22 shows a configuration where the strap 810 is doubled looped 2230 around two fixed points and then run back through the cam-strap device 600 according to arrow 2220. As noted above, this may increase the load that the cam-strap device 600 may bear.

Figure 23A:
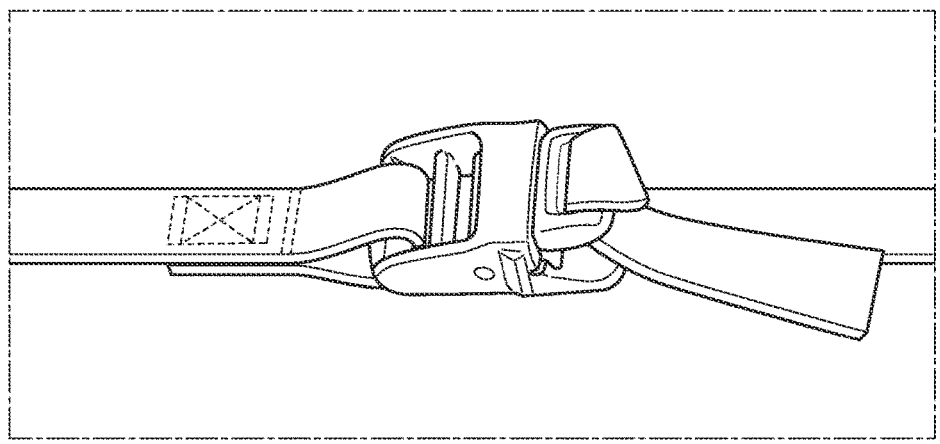
FIGS. 23a-23c show additional ways of locking down a loose end of the strap to prevent accidental release.
Figure 23B:
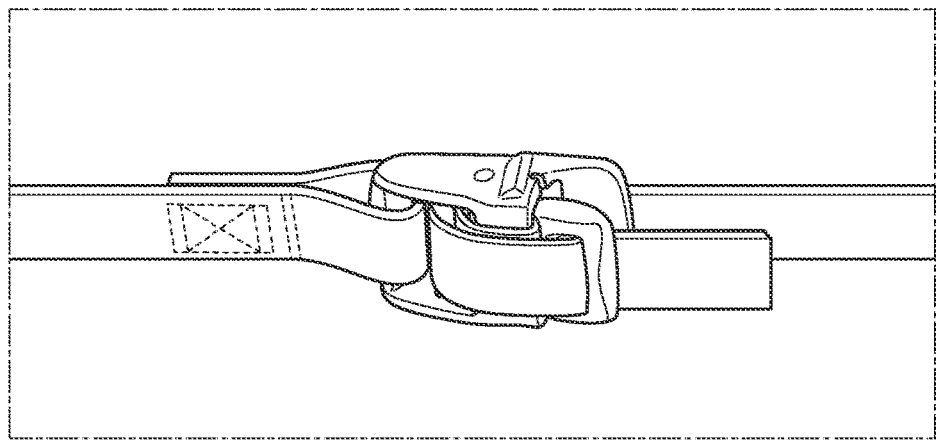
Figure 23C:
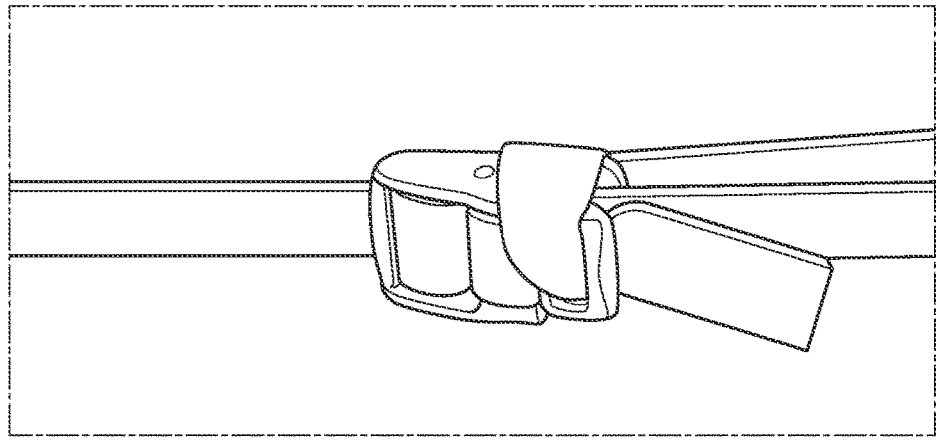

FIGS. 23a-23c show additional ways of locking down a loose end of the strap 810 to prevent accidental release. In FIG. 23a (device 100), the loose end exiting the capture ring (aperture 150), is looped back through the capture ring. In FIG. 23b (device 100), the loose end is not first passed through the capture ring but is, instead, run up through the sewn end and back down through the capture ring. In FIG. 23c (device 600), the loose end is wrapped around the straps and looped back through the capture ring.

The uses and configurations described in relation to cam-strap devices 100, 600 are applicable to both cam-strap devices 100, 600 and other embodiments to the extent that the components in each make those configurations possible.

The previous detailed description is of a small number of embodiments for implementing the systems and methods for creating a cam-strap device and the systems of a cam-strap device and is not intended to be limiting in scope. The following claims set forth a number of the embodiments of the systems and methods for creating a cam-strap device and the systems of a cam-strap device disclosed with greater particularity.

What is claimed:

1. A system for holding flat straps, the system comprising:
a device body, the device body having an attachment area for attaching a strap and a cam area for adjustably attaching the strap; and
a hub, the hub constrained within the cam area by a pivot pin and oriented in the cam area such that the hub may rotate to capture the strap between the hub and the device body; wherein the hub includes an arm that is nearly tangential to the hub, the arm having a gripping surface and the body includes a gripping portion and the cam area is a cavity in the device body wherein the cavity has an entrance, a top part of the entrance having the gripping portion of the body and the gripping surface of the arm has a bottom portion of the arm that is nearly tangential to the hub, and the top part of the entrance having a side opposite the gripping surface of the arm and a surface of the body has a bottom portion, and wherein the strap may be fed through a bottom part of the entrance around a rotation point of the hub and over the arm and out of the top part of the entrance and where the hub is positioned to rotate; and the gripping surface extends from the arm that is nearly tangential to the hub, the arm having a plurality of raised protrusions which extend substantially perpendicularly from the arm toward the gripping area, the gripping surface positioned such that it opposes the gripping portion of the body such that as the strap that is fed through the bottom part of the entrance around the rotation point of the hub and out of the top part of the entrance is pulled out of the bottom part of the entrance, the strap causes the hub to rotate towards the gripping portion of the body and the gripping portion and gripping surface holds the strap, the hub may rotate around the rotation point and, during rotation, moves closer to the gripping portion when applying a tensioning force to said flat strap and farther away from the gripping portion when the tensioning force is removed from said flat strap.

2. The system of claim 1, wherein the strap is attached to the attachment area by sewing the strap to itself and passing it around a bar of the device body.

3. The system of claim 1, wherein the attachment area includes a plurality of bars and apertures, the plurality of bars oriented parallel to each other, such that the strap may be wrapped around them to hold the strap.

4. The system of claim 1, wherein a pin holds the hub in the device body.

5. The system of claim 1, wherein the hub includes a capture ring, the capture ring located radially away from the rotation point of the hub such that it is not located in the cavity, the capture ring shaped to receive the strap that is fed through the bottom part of the entrance around the rotation point of the hub.

6. The system of claim 5, wherein the attachment area includes at least one bar and two apertures such that the strap may be wrapped around the attachment area.

7. The system of claim 1, wherein the plurality of raised protrusions which extend substantially perpendicularly from the arm are shaped to have a side perpendicular to the gripping surface of the hub on a first side and an obtuse angle to the gripping surface on a second side, the first side positioned to oppose the removal of the strap.

8. The system of claim 7, wherein the hub is spring loaded to stay proximate to the gripping area of the body.

* * * * *